Patented July 20, 1948

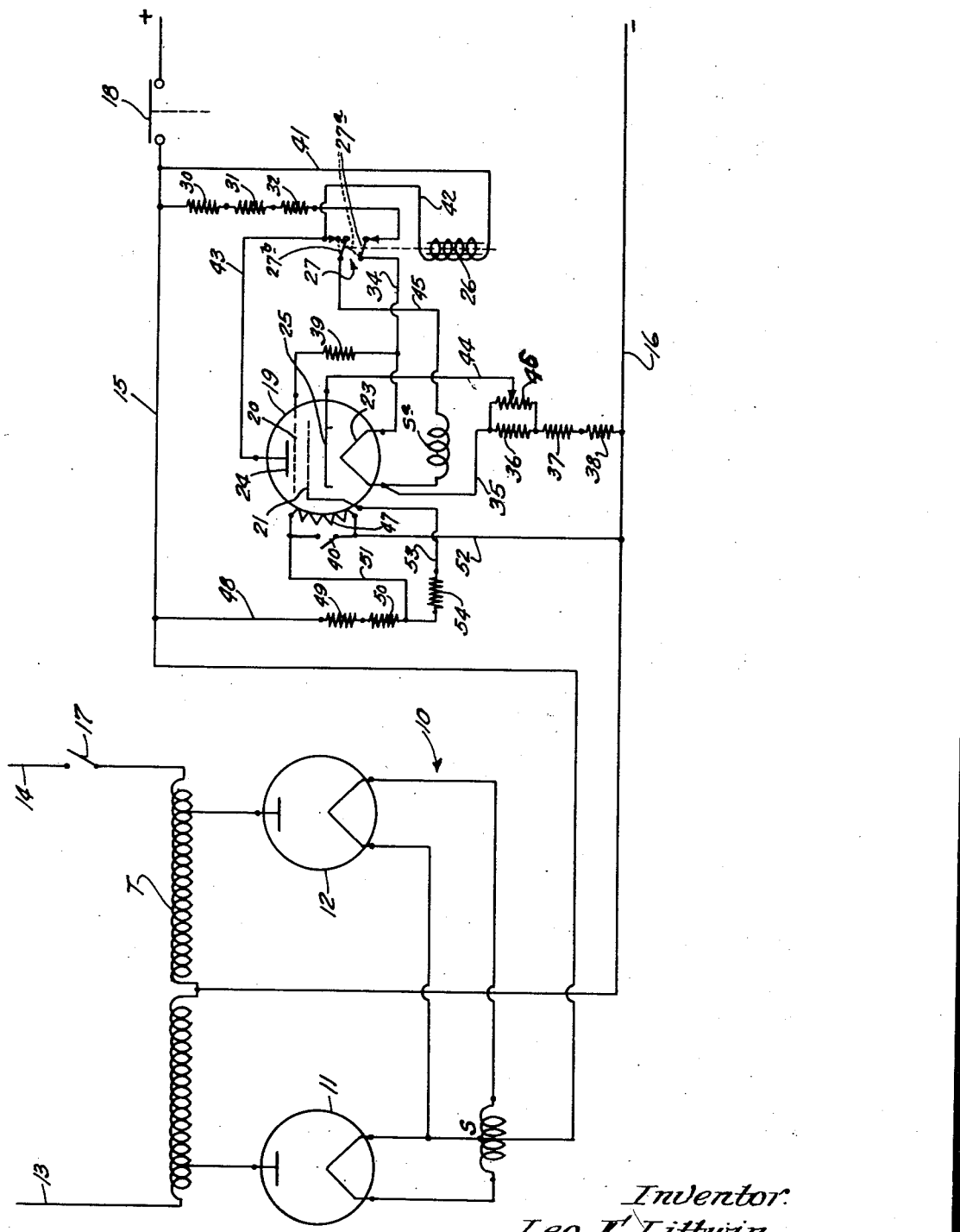

2,445,681

UNITED STATES PATENT OFFICE 2,445,681

CONTROL APPARATUS

Leo F. Littwin, Chicago, Ill.

Application April 2, 1945, Serial No. 586,231

7 Claims. (Cl. 175—320)

This invention relates to control apparatus.

In the use of rectifiers employing mercury-vapor rectifier tubes, it is the general practice to delay imposing a full load on the rectifier until the tubes have been raised to a proper temperature. In fact, manufacturers of such tubes frequently instruct users to that effect since a full load placed on a tube before the filament has reached a proper temperature produces sputtering and arcing and rapid deterioration of the filament with resultant short tube life. Hence rectifiers for passing relatively heavy current in particular, as for industrial machines, generally are provided with time-delay means which afford a period for heating the tubes before the full load is placed on the rectifier. Such time delay means have been of various types such as relay-controlled timers, clock controlled mechanism and the like which, when the input circuit to the rectifier is interrupted, even momentarily, delay the reoperation of the rectifier during the particular recycling period inherent in the control mechanism notwithstanding that upon mere momentary interruption of the circuit the tubes are sufficiently heated to enable them to resume full load immediately without resulting damage. Such timers also may not afford the desired protection to the tubes under all conditions inasmuch as the fixed cycling period of a timer, giving a fixed period of delay in rectifier action, may not be adequate under some conditions, as under varying ambient temperatures affecting the tubes.

It is an object of the present invention to provide a time control apparatus which is responsive to temperature conditions affecting or determined by a control tube whereby imposition of a full load on the rectifier, starting from a cold condition, or reimposition of the load after only a momentary interruption of the rectifier input circuit is dependent upon the optimum heat requirements of the rectifier tubes. Hence with the present arrangement a longer pre-heat period will be required to condition the tubes for operation where ambient temperatures are lower than where they are higher and resumption of load, after momentary circuit interruption will be substantially simultaneous with the re-closing of the input circuit where the rectifier tubes are at a proper operating condition.

Another specific object of the invention is to provide a time control apparatus for a rectifier having rectifier tubes, which apparatus is responsive to ambient temperatures affecting a tube of the control apparatus which temperatures will likewise affect the rectifier tubes.

A more specific object of the invention is to provide a control apparatus of the type mentioned employing a grid controlled tube, the voltage on which grid is built up to the critical or operating value by a voltage shift from the tube filament.

A further object of the invention is to provide a control apparatus employing a grid controlled tube which is adapted to afford protection to the tubes of a rectifier but which affords protection to the control tube also.

Other objects of the invention relate to various features of arrangement of parts of the control apparatus, which will be apparent from a consideration of the following specification and accompanying drawing wherein a circuit diagram of the improvements is shown in conjunction with a rectifier that is controlled by the apparatus.

In the drawing 10 indicates generally a current rectifier of conventional form employing two mercury vapor rectifying tubes 11 and 12 which cooperate to rectify the two half waves of an alternating current supplied by input leads 13 and 14 for delivery of a D. C. current load through the output leads 15 and 16 to a device to be operated, as an electric magnet for example, not shown.

Assuming that A. C. current is supplied to the rectifier 10 from input leads 13 and 14 by closing main switch 17 and that the rectifier tubes are cold, the rectifier 10 will not deliver its full current load to the device to be operated by reason of an open switch 18 in the output conductor 15. Direct current potentials will be imposed on the leads 15 and 16, however, as the tubes 11 and 12 are heated up by current from secondary winding S of the transformer of the rectifier 10, and sufficient current will flow through the tubes 11 and 12 and in the control device to heat the tubes to a desired operating temperature in a period of time dependent generally on ambient temperature and other conditions.

The control device illustrated comprises a grid controlled tube 19 shown as having two control grids 20 and 21 preferably, although, as hereinafter mentioned, a tube with a single grid may be employed for attaining some of the advantages of the invention under conditions where ambient temperature conditions are not an important factor in determining tube life.

The tube 19 has a filament 23, by means of which the tube is initially heated by direct current and an anode 24 and a cathode 25 between which current flows, when the proper temperature conditions have been attained, for energizing a solenoid 26 which is operatively connected to and closes the output current switch 18 and also moves a double pole switch 27 from the full line position to the dotted line position. When the solenoid 26 has been so operated, the full current load is delivered by the rectifier and, as hereinafter explained, the flow of current from the anode 24 to the cathode 25 is thereupon interrupted for prolonging the tube life, although A. C. current then flows through the filament 23 from the secondary $S^a$ of the rectifier transformer T to retain the tube at a proper operating temperature so long as the main switch 17 is closed.

The function of the control apparatus may be described as follows, it being assumed that the rectifier tubes 11 and 12 and control tube 19 are cold and that the main switch 17 has just been closed.

Current from the positive output conductor 15 will flow through current limiting resistors 30, 31 and 32 to the switch arm 27a, conductor 34, to the filament 23, conductor 35 and resistors 36, 37 and 38 to the conductor 16. A potential that is negative with respect to the potential of the input lead 15 will be imposed on the grid 20 by reason of its connection through resistors 30, 31, and 32 and with conductor 34 through a resistor 39. This potential is a blocking potential and prevents the passage of current by the elements 24 and 25. As the temperature of the filament 23 increases, its resistance increases, thus increasing the potential drop across the filament and decreasing the negative potential of the grid 20, or making it more positive. The resulting decrease in the negative potential of the grid 20 brings the potential to that required in the particular style of tube used, such as −4 volts, for permitting the tube to pass current from the anode 24 to the cathode 25, assuming that the other grid 21 has been omitted or is rendered ineffective by the closing of a switch 40.

The described voltage shift to the grid will give it a critical or tube operating potential and will permit the tube to pass current only when the filament has reached the proper operating temperatures, whereupon the solenoid 26 is operated to close the output switch 18 and to shift the double pole switch 27 from the full line to the dotted line position. The closing of the switch 18 enables the rectifier to pass its full current load to the device to be operated, not shown. The heating of tube 19 to the proper operating temperature will be concurrent with the heating of the tubes 11 and 12 to proper temperature and hence the latter do not come into full load operation until tube 19, having similar heating characteristics, and inclosed in the same casing, not shown, has arrived at the proper operating temperature and has passed current to actuate the solenoid.

When the critical negative or operating potential of the grid has been reached such as −4 volts for example, current will flow from lead 15 to conductor 41, through the solenoid winding, conductor 42, conductor 43 to the anode 24 and thence to the cathode 25 and through conductor 44 to a variable resistor 46, resistors 37 and 38 to the lead 16.

When the double pole switch 27 has been shifted by the solenoid, as stated above, the solenoid is energized by flow of current through conductor 41, the solenoid winding, conductor 42 switch arm 27b (then in the upper or dotted position) conductor 45, conductor 35 and thence through resistors 36, 37, 38 to the lead 16. In this position of the switch 27 the lower arm 27a makes contact with arm 27b to close the circuit of secondary $S^a$ for effecting the heating of the filament 23 by A. C. current from the transformer T. The solenoid remains so energized until the switch 17 is opened or until there is otherwise an interruption in the input current, whereupon the solenoid will, by reason of conventional spring action, open the switch 18 and also switch 27. If such interruption is momentary and current in the leads 13, 14 is reestablished before there is any substantial change in the temperature of the tube 19 (and hence in tubes 11 and 12), the tube 19 will immediately pass current to the solenoid as above explained and reclose switch 18 and again move switch 27 to the dotted line position. Under such conditions no recycling delay is incurred as where mechanical time control devices are employed.

Whenever the switch 27 is in the dotted line position and the full load from the rectifier is being delivered, current from conductor 42 bypasses the anode 24 by flowing through the switch arm 27b to conductor 45. Hence the tube 19 does not continue to pass current during periods of normal delivery of full load by the rectifier. The period of usefulness of the tube 19 is thereby prolonged and the periods of usefulness of the tubes 11 and 12 are prolonged by the protection afforded to them by the time-delay action of the apparatus described.

I have found in many instances where the ambient temperature of the tubes 11, 12 and 19 varies considerably, that it is desirable to employ an additional grid 21 in such relation that the potential thereof is utilized in conjunction with the potential of grid 20, for controlling the operation of the tube 19 and rendering the tube operative only when the ambient temperature is at a predetermined minimum notwithstanding that the filament 23 may have been raised previously to proper operating temperature. For this purpose I provide a compensating winding or resistor 47 on or about the envelope of the tube, the winding being of "Hytempco" or like material, the electric resistance of which appreciably increases or decreases with increase or decrease respectively in temperatures in the lower temperature ranges. The winding 47 is connected to the positive lead 15 through conductor 48, resistors 49, 50, and conductor 51 and by conductor 52 the winding is connected to the negative lead 16. A conductor 53 having a current limiting resistor 54 connected therein, connects conductor 51 to the grid 21. As the filament 23 heats up as above described, the envelope of the tube 19 also heats up as does the immediately surrounding air. The same is true of the tubes 11 and 12, that is, they become heated in time by their respective filaments. However, the heating of the tube envelopes is affected by the temperature of the surrounding air and the filaments of the tubes 11 and 12 may reach approximately the predetermined temperature before the mercury of the tubes has adequately vaporized in instances where the ambient temperature of the tubes is relatively low for example. The compensator winding 47 of tube 19 is responsive to the ambient temperature of the tube 19 and hence it is desirable in many instances, as stated, to delay the passing of current by the tube 19 until the ambient temperature thereof has risen to a predetermined value such that the mercury will have been adequately vaporized in all the tubes.

As the resistor 47 becomes heated, its resistance increases whereby the potential drop across resistors 49 and 50 is decreased, thereby making more positive or less negative the potential on the grid 21. Until the cooperative control potentials on the two grids have reached proper or critical values which may be −2 volts in each instance, the tube 19 will not pass current. Hence with the switch 40 opened, where such a switch is employed, the ambient temperature of the tube 19 also becomes a controlling factor in the operation of the tube. Since the rectifier 10 and the improved control device preferably are built as a unit and mounted within the same casing, the tubes 11 and 12 are subjected to the same ambient temperature that affects tube 19. The values of the various resistors being properly selected, it is assured that the tubes 11 and 12 will be in proper condition for delivery of full load whenever the tube 19 passes current to the solenoid under the cooperative control of the two grids 20 and 21, the critical or operating potentials of which are derived from the voltage shift to the grids that occurs by reason of the increase in resistance accompanying the predetermined increases in temperature of the filament 23 and winding 47 respectively.

While I have shown and described an embodiment of the invention for the purpose of illustration, it will be apparent that the principle of the invention can be utilized in modifications of the particular circuit disclosed.

I claim:

1. Time control apparatus for a rectifier provided with rectifying tubes that require heating to an operating temperature before delivery to the load circuit of full load to avoid damage to the tubes, the time control apparatus comprising a circuit, a switch for opening and closing the output circuit, said circuit including electrically actuated means for closing said switch, a tube having a filament circuit connected across the leads of said output circuit, an anode and cathode in the tube connected across said leads and in circuit with said electrically actuated means for effecting actuation of the latter when the tube passes current, and a current control grid in the tube connected to the filament circuit of the tube for receiving initially therefrom a current blocking potential which is altered to a current passing potential by means of a voltage shift from the filament by the heating of the filament to a predetermined temperature.

2. Time control apparatus for an alternating current rectifier having rectifying tubes that require heating to a predetermined temperature before delivery of full load by the rectifier to avoid tube damage and having direct current output leads, said apparatus comprising a switch for controlling the flow of output current through said leads, a circuit including electrically actuated means for closing said switch, a tube having a filament circuit connected across said leads for heating to a predetermined operating temperature, anode and cathode elements in the tube for passing current to said means for effecting actuation thereof, and a grid in the tube connected in the filament circuit whereby shifting voltage in the circuit resulting from increasing resistance of the filament as the same is being heated to said operating temperature varies the potential of said grid for effecting the passing of current by said elements.

3. Time control apparatus for an alternating current rectifier having direct current output leads, said apparatus comprising a normally open switch in one of said leads for controlling the flow of output current from the rectifier, a circuit including electrically operated means for closing said switch, a tube having anode and cathode elements for passing operating current to said means, a filament in said tube having a circuit connected across said leads, and a current control grid in the tube connected to said filament circuit and responsive to the potential shifting in the filament circuit for effecting the blocking or passing of current by said elements when the temperature of the filament is below or at a predetermined temperature, respectively.

4. Time control apparatus for an alternating current rectifier provided with rectifier tubes that require heating to a predetermined temperature before delivery of full current load to avoid damage and having direct current output leads, said apparatus comprising a switch in one of the output leads, a circuit including electrically operated means for closing said switch, a control tube provided with a heating filament circuit connected across said leads, current passing elements in the control tube for supplying operating current to said means, a control grid in the control tube adapted to block the passage of current by said elements while the potential of the grid is below a critical current passing potential, said grid being connected to the filament circuit of the tube whereby the impressed potential of the grid reaches a current passing value by voltage shift from the filament as the filament reaches an operating temperature, and means operable by said electrically operated means for terminating the passage of current by said tube elements upon the closing of said switch.

5. A timer for delaying the delivery of a full output current load by an alternating current rectifier having mercury vapor rectifier tubes until said tubes are heated to a predetermined operating temperature and having direct current output leads having a switch therein, said timer comprising a circuit including a control tube having a heating filament, a circuit for the filament connected across said leads, current passing elements in the control tube, means operable by current from said elements for closing said switch, a grid in the control tube connected to the filament circuit and having a potential impressed from said circuit of a value to block the passing of current by said elements when said filament is below a predetermined temperature, a second grid in said control tube, and a winding exteriorly of the tube having a circuit connected across said leads and connected to said second grid for impressing a current blocking potential thereon when the ambient temperature of the tube affecting said winding is below a predetermined value whereby the shifting of potentials to said grids by the increase in temperature of said filament and winding to predetermined temperatures produce non-blocking grid potentials and enable said elements to pass operating current to said means for effecting the closing of said switch.

6. For use with an alternating current rectifier having mercury vapor rectifier tubes that require pre-heating to avoid damage thereto and current output leads, a timer for delaying delivery of full current load by said rectifier comprising a normally open switch in one of said leads, a circuit including electrically operated means for operating the switch to closed position, a control tube having current passing elements adapted to pass operating current to said means, a filament within the control tube having heating characteristics similar to the heating characteristics of the tubes of said rectifier and having a circuit connected across said leads, a winding exteriorly of said control tube subjected to the same ambient temperature as that of said rectifier tubes and having a circuit connected across said leads, and grids in said control tube one connected to the circuit of said filament and the other to the circuit of said winding for receiving therefrom respectively impressed potentials of values that cooperate to block the passage of current by said elements while the temperatures of said filament and winding are below predetermined values and that cooperate to effect the passing of current by said elements when said temperatures reach said respective predetermined values.

7. A timer comprising a tube having current passing elements, an electric circuit providing a source of potential, a grid in the tube connected in the circuit and adapted to have impressed thereon a potential of a value normally to block the passage of current by said elements, a resistor connected in the circuit exteriorly of the tube and subject to the ambient temperatures thereof, and a second grid in the tube connected to the circuit of said resistor whereby as said resistor reaches a predetermined temperature a potential is shifted to said grid by said resistor of a value to cooperate with the potential of said first grid to effect the passing of current by said elements.

LEO F. LITTWIN.

REFERENCES CITED

The following references are of record in the file of this patent:

UNITED STATES PATENTS

| Number | Name | Date |
|---|---|---|
| 1,954,680 | Morack | Jan. 10, 1931 |
| 1,983,643 | Simon et al. | Dec. 11, 1934 |
| 2,044,618 | Livingston | June 16, 1936 |
| 2,050,708 | Herz | July 29, 1941 |
| 2,073,701 | Lazzarini | Mar. 16, 1937 |
| 2,120,787 | Lowkrantz | June 14, 1938 |
| 2,206,008 | Spencer | June 25, 1940 |
| 2,281,619 | Roberts | May 5, 1942 |
| 2,378,311 | McCreary | June 12, 1945 |

FOREIGN PATENTS

| Number | Country | Date |
|---|---|---|
| 487,385 | Germany | Dec. 14, 1929 |